(12) United States Patent
Mitsufuji

(10) Patent No.: US 10,602,266 B2
(45) Date of Patent: Mar. 24, 2020

(54) AUDIO PROCESSING APPARATUS AND METHOD, AND PROGRAM

(71) Applicant: Sony Corporation, Tokyo (JP)

(72) Inventor: Yuhki Mitsufuji, Tokyo (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 15/516,563

(22) PCT Filed: Sep. 28, 2015

(86) PCT No.: PCT/JP2015/077242
§ 371 (c)(1),
(2) Date: Apr. 3, 2017

(87) PCT Pub. No.: WO2016/056410
PCT Pub. Date: Apr. 14, 2016

(65) Prior Publication Data
US 2018/0279042 A1    Sep. 27, 2018

(30) Foreign Application Priority Data

Oct. 10, 2014    (JP) ................... 2014-208865

(51) Int. Cl.
*H04R 3/00*     (2006.01)
*H04R 1/40*     (2006.01)
(Continued)

(52) U.S. Cl.
CPC ............. *H04R 3/005* (2013.01); *G01S 3/808* (2013.01); *H04R 1/40* (2013.01); *H04R 1/406* (2013.01);
(Continued)

(58) Field of Classification Search
CPC .. H04R 3/005; H04R 1/406; H04R 2201/403; H04R 1/40; H04S 7/303; H04S 2400/15; G01S 3/808
See application file for complete search history.

(56) References Cited

U.S. PATENT DOCUMENTS 4,631,710 A * 12/1986 Yamaguchi .......... G10K 11/346
                                                    367/103
2011/0123046 A1    5/2011 Hiroe
(Continued)

FOREIGN PATENT DOCUMENTS

JP    2008-048294 A    2/2008
JP    4124182 B2    7/2008
(Continued)

OTHER PUBLICATIONS

Written Opinion and English translation thereof dated Dec. 15, 2015 in connection with International Application No. PCT/JP2015/077242.
(Continued)

*Primary Examiner* — Ping Lee
(74) *Attorney, Agent, or Firm* — Wolf, Greenfield & Sacks, P.C.

(57) ABSTRACT

The present technology relates to an audio processing apparatus and method capable of improving localization of an audio image at lower cost, and a program.
A microphone array picks up a planar wave of the audio from a sound source. A drive signal generation unit generates a speaker drive signal of a spatial domain on the basis of a spatial frequency spectrum of a sound pickup signal acquired by the sound pickup by the microphone array. An orientation information acquisition unit acquires talker's orientation information on an orientation of a talker. A spatial filter application unit performs a filter processing on the speaker drive signal by use of a spatial filter defined by the talker's orientation information thereby to reduce spatial aliasing. The present technology can be applied to a spatial aliasing controller.

6 Claims, 7 Drawing Sheets

(51) Int. Cl.
*H04S 7/00* (2006.01)
*G01S 3/808* (2006.01)
(52) U.S. Cl.
CPC ........ *H04S 7/303* (2013.01); *H04R 2201/403* (2013.01); *H04S 2400/15* (2013.01)

(56) References Cited

U.S. PATENT DOCUMENTS

| | | | |
|---|---|---|---|
| 2012/0128160 A1 | 5/2012 | Kim et al. | |
| 2013/0259243 A1 | 10/2013 | Herre et al. | |
| 2013/0268280 A1 | 10/2013 | Del Galdo et al. | |
| 2014/0012095 A1* | 1/2014 | Sako | A61B 7/023 600/301 |

FOREIGN PATENT DOCUMENTS

| | | |
|---|---|---|
| JP | 2011-107602 A | 6/2011 |
| JP | 2014-501064 A | 1/2014 |
| JP | 2014-501945 A | 1/2014 |

OTHER PUBLICATIONS

International Preliminary Report on Patentability and English translation thereof dated Apr. 20, 2017 in connection with International Application No. PCT/JP2015/077242.

\* cited by examiner

AUDIO PROCESSING APPARATUS AND METHOD, AND PROGRAM

CROSS-REFERENCE TO RELATED APPLICATIONS

This application is a National Stage of International Application No. PCT/JP2015/077242, filed in the Japanese Patent Office as a Receiving office on Sep. 28, 2015, which claims priority to Japanese Patent Application Number 2014-208865, filed in the Japanese Patent Office on Oct. 10, 2014, each of which is hereby incorporated by reference in its entirety.

TECHNICAL FIELD

The present technology relates to an audio processing apparatus and method, and a program, and particularly to an audio processing apparatus and method capable of improving localization of an audio image at lower cost, and a program.

BACKGROUND ART

There has been conventionally known a wavefront synthesis technique for reproducing a sound field by use of a planar speaker array or linear speaker array. Such a wavefront synthesis technique can be used for next-generation bidirectional communication or the like as illustrated in FIG. 1, for example.

In FIG. 1, next-generation bidirectional communication is made between a space P11 in which a talker W11 is present and a space P12 in which a talker W12 is present.

Specifically, in the space P11, a sound field A made of the audio mainly issued by the talker W11 is picked up by a linear microphone array MCA11 configured of a plurality of longitudinally-arranged microphones as illustrated and a resultant sound source signal is transmitted to the space P12.

In the example, the illustrated arrow indicates a direction in which the audio of the talker W11 as sound source propagates, and the audio of the talker W11 arrives at an angle θ viewed from the linear microphone array MCA11 and is picked up. In the following, the angle θ, or an angle formed between the direction in which the audio propagates from the sound source and the direction in which the microphones configuring the microphone array are arranged will be denoted as arrival angle θ.

In the space P12, a speaker drive signal for reproducing the sound field A is generated from the sound source signal transmitted from the space P11. Then, the sound field A is reproduced on the basis of the speaker drive signal generated by a linear speaker array SPA11 configured of a plurality of longitudinally-arranged speakers in the space P12 as illustrated.

In the example, the illustrated arrow indicates a direction in which the audio output from the linear speaker array SPA11 and directed to the talker W12 propagates. An angle formed between the propagation direction and the linear speaker array SPA11 is the same as the arrival angle θ.

Incidentally, though not illustrated here, a linear microphone array is provided also in the space P12, a sound field B configured of the audio mainly issued by the talker W12 is picked up by the linear microphone array and a resultant sound source signal is transmitted to the space P11. Further, in the space P11, a speaker drive signal is generated from the sound source signal transmitted from the space P12 and the sound field B is reproduced by the linear speaker array (not illustrated) on the basis of the resultant speaker drive signal.

Incidentally, when a sound field is reproduced by use of a microphone array or speaker array in this way, an infinite number of speakers and microphones need to be arranged in order to reproduce the sound field in a physically accurate manner. For example, when the speakers or microphones are discretely arranged as in the example illustrated in FIG. 1, spatial aliasing is caused.

The highest spatial frequency (which will be denoted as upper limit spatial frequency below) $k_{lim}$, which is not violated by the spatial aliasing, is determined by a lower spatial Nyquist frequency calculated by an interval of the speakers configuring the speaker array or an interval of the microphones configuring the microphone array.

That is, assuming the interval of the microphones as $d_{mic}$ and the interval of the speakers as $d_{spk}$, the upper limit spatial frequency $k_{lim}$ is found in the following Equation (1).

[Mathematical formula 1]

$$k_{lim} = \min\left(\frac{\pi}{d_{mic}}, \frac{\pi}{d_{spk}}\right) \quad (1)$$

The thus-acquired upper limit spatial frequency $k_{lim}$ has an effect on localization of a sound image, and preferably takes a higher value generally.

Further, a relationship between a frequency (which will be denoted as temporal frequency below) f of a sound source signal and a spatial frequency k is as indicated in the following Equation (2). Note that c indicates a sound speed in Equation (2).

[Mathematical formula 2]

$$f = \frac{c}{2\pi}k \quad (2)$$

Therefore, when no solution is particularly taken, the highest temporal frequency (which will be denoted as upper limit temporal frequency below) $f_{lim}$, which is not violated by the spatial aliasing, can be found in Equation (2). The upper limit temporal frequency $f_{lim}$ has an effect on sound quality, and is assumed to generally demonstrate high reproducibility or high fidelity (HiFi) at a higher value.

The spatial aliasing will be described herein. FIG. 2 illustrates a spatial spectrum based on a difference in arrival angle of a planar wave of the audio from the sound source, which is also called angle spectrum since a position of a spectrum peak of the spatial spectrum changes depending on the arrival angle of the planar wave. Note that, in FIG. 2, the vertical axis indicates a temporal frequency f and the horizontal axis indicates a spatial frequency k. Further, a line L11 to a line L13 indicate a spectrum peak, respectively.

There is illustrated, on the left side in the Figure, how the angle spectrum is at the arrival angle θ=0 of the original planar wave before spatial sampling is performed or before the planar wave is picked up by the microphone array. In the example, the spectrum peak appears in the positive direction of the spatial frequency k as indicated by the line L11.

To the contrary, there is illustrated, on the right side in the Figure, how the angle spectrum of the sound source signal acquired by performing the spatial sampling on the planar wave at the arrival angle θ=0 or picking up the planar wave by the microphone array configured of the discretely-arranged microphones is.

In the example, the line L12 corresponds to the line L11 and indicates a spectrum peak to essentially appear. Further, the line L13 indicates a spectrum peak appearing due to the spatial aliasing, and in the example, the spatial aliasing is remarkably caused in an area in which the temporal frequency f is higher than the upper limit temporal frequency $f_{lim}$ and the spatial frequency k is negative.

Except for the spatial aliasing, the spectrum peak should essentially appear in the area in which the spatial frequency k is negative when the arrival angle θ of the planar wave is at π/2≤θ≤π.

Therefore, in the example illustrated on the right side in the Figure, when the picked-up planar wave (sound field) is reproduced, an audio image is localized as if planar wave signals are mixed at various different angles due to an effect of the spectrum peak caused by the spatial aliasing.

Thus, even when the speaker drive signal for wavefront synthesis is generated from the sound source signal acquired by the sound pickup and the planar wave is reproduced by the speaker array on the basis of the speaker drive signal, a listener cannot feel the correct planar wave. Additionally, when the talkers approach each other in the next-generation bidirectional communication by way of example, not a planar wave but a spherical wave is caused, but is similar to a planar wave As described above, an audio image cannot be accurately localized when spatial aliasing is caused. Thus, there is proposed a technique for further enhancing the upper limit temporal frequency $f_{lim}$, which is not violated by spatial aliasing, by use of two speaker arrays including high-tone speaker unit and low-tone speaker unit having mutually-different speaker intervals for reduction in spatial aliasing (see Patent Document 1, for example). With the technique, it is possible to accurately reproduce a signal having a higher temporal frequency.

CITATION LIST

Patent Document

Patent Document 1: Japanese Patent No. 4124182

SUMMARY OF THE INVENTION

Problems to be Solved by the Invention

However, with the above technique, localization of an audio image can be improved, but additional speaker arrays for enhancing the upper limit temporal frequency $f_{lim}$, or two speaker arrays need to be prepared, which costs much. It is desirable to further enhance the upper limit temporal frequency $f_{lim}$ while keeping the speaker interval of an existing speaker array in order to improve localization of an audio image.

The present technology has been made in terms of the situation, and is directed for improving localization of an audio image at lower cost.

Solutions to Problems

An audio processing apparatus of one aspect of the present technology includes: an orientation information acquisition unit for acquiring orientation information on a direction of a sound source; and a spatial filter application unit for applying a spatial filter with a characteristic defined by the orientation information to a sound pickup signal acquired by picking up the audio from the sound source by a microphone array configured of a plurality of microphones.

The spatial filter application unit can determine a center frequency and a band width as characteristic of the spatial filter on the basis of the orientation information.

Assuming a band of a spatial frequency defined by the center frequency and the band width as transmissive frequency band, the spatial filter may be assumed as a filter for transmitting a component of the transmissive frequency band of the sound pickup signal.

Assuming a band of a temporal frequency defined by the center frequency and the band width as transmissive frequency band, the spatial filter may be assumed as a filter for transmitting a component of the transmissive frequency band of the sound pickup signal.

The spatial filter application unit can determine a characteristic of the spatial filter such that the band width is larger as an angle formed between a direction of the sound source indicated by the orientation information and the microphone array is closer to π/2.

The microphone array may be assumed as linear microphone array.

An audio processing method or program of one aspect of the present technology includes the steps of: acquiring orientation information on a direction of a sound source; and applying a spatial filter with a characteristic defined by the orientation information to a sound pickup signal acquired by picking up the audio from the sound source by a microphone array configured of a plurality of microphones.

According to one aspect of the present technology, orientation information on a direction of a sound source is acquired, and a spatial filter with a characteristic defined by the orientation information is applied to a sound pickup signal acquired by picking up the audio from the sound source by a microphone array configured of a plurality of microphones.

Effects of the Invention

According to one aspect of the present technology, it is possible to improve localization of an audio image at lower cost.

Additionally, the effects described herein are not necessarily limited, and any effect described in the present disclosure may be obtained.

MODE FOR CARRYING OUT THE INVENTION

An embodiment to which the present technology is applied will be described below with reference to the drawings.

First Embodiment

<Exemplary Configuration of Spatial Aliasing Controller>

The present technology applies a spatial filter suitable for a speaker drive signal in generating the speaker drive signal for performing wavefront synthesis when a sound field is reproduced by use of a planar speaker array or linear speaker array, thereby reducing spatial aliasing caused by discrete arrangement of the speakers.

Specifically, according to the present technology, spatial aliasing is reduced at the expense of wavefront for propagation in an unintended direction, thereby realizing an increase in upper limit temporal frequency $f_{lim}$.

Figure 1:
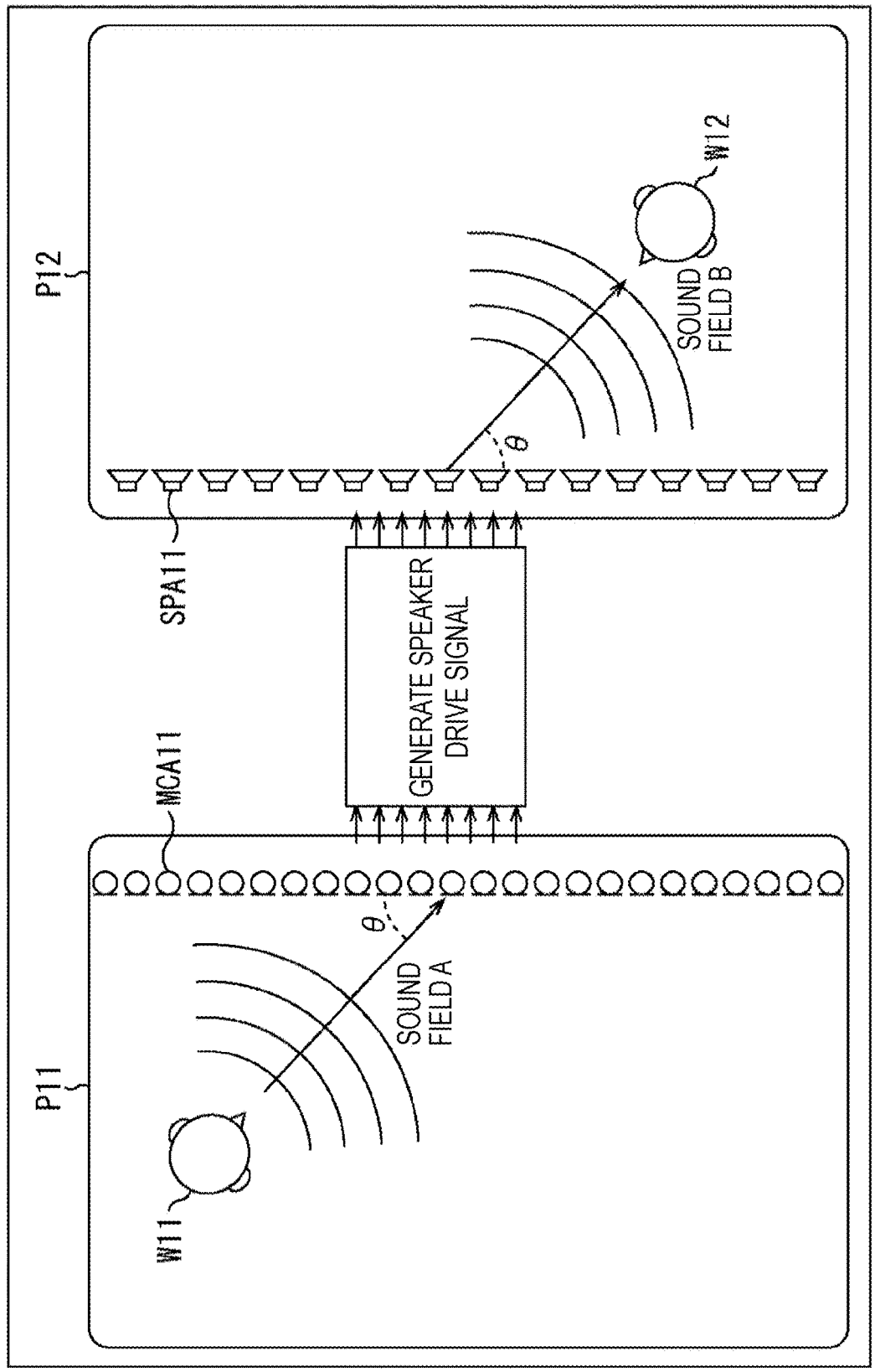
FIG. 1 is a diagram for explaining next-generation bidirectional communication.
Figure 2:
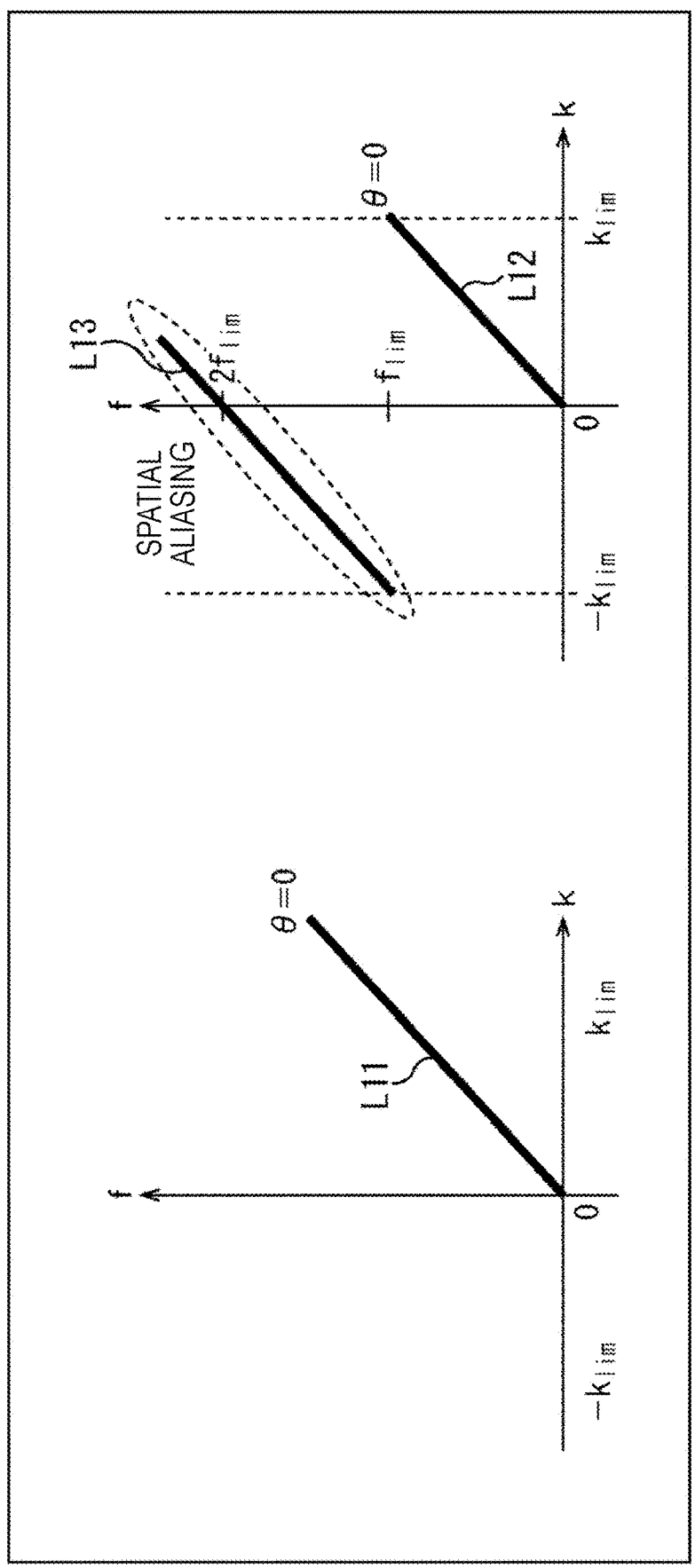
FIG. 2 is a diagram for explaining spatial aliasing.

For example, when a positional relationship between talkers is apparent as in the next-generation bidirectional communication described with reference to FIG. 1, it is possible to specify a propagation direction of wavefront to be preferentially reproduced and other unintended directions. Thus, a spatial frequency is cut off in a specified unintended direction thereby to increase the upper limit temporal frequency $f_{lim}$.

A specific embodiment to which the present technology is applied will be described below by way of a spatial aliasing controller to which the present technology is applied.

Figure 3:
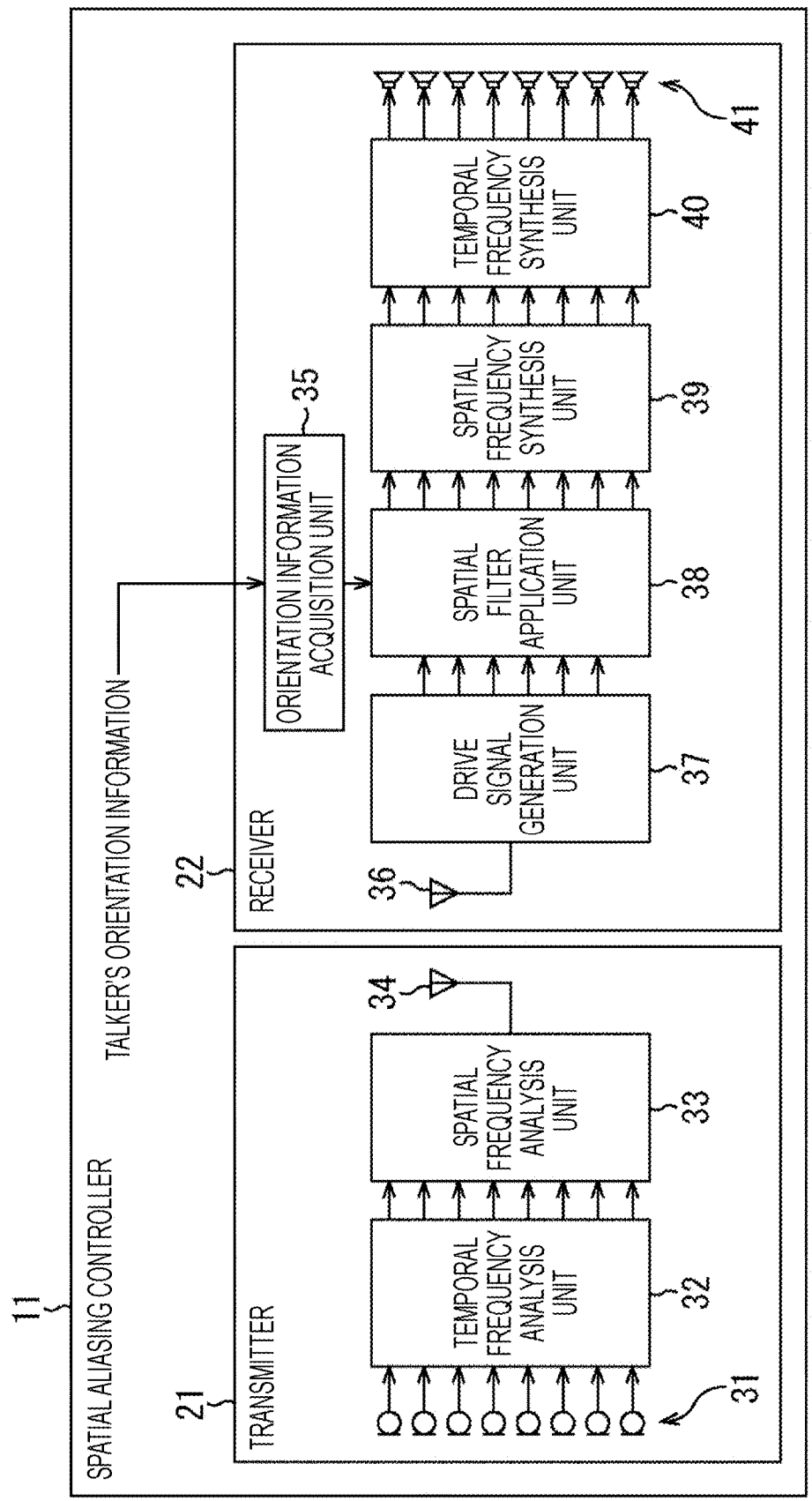
FIG. 3 is a diagram illustrating an exemplary configuration of a spatial aliasing controller.

FIG. 3 is a diagram illustrating an exemplary configuration of one embodiment of the spatial aliasing controller to which the present technology is applied.

A spatial aliasing controller 11 has a transmitter 21 and a receiver 22. In the example, for example, the transmitter 21 is arranged in a sound pickup space for picking up a sound field, and the receiver 22 is arranged in a reproduction space for reproducing the sound field picked up in the sound pickup space.

The transmitter 21 picks up a sound field, and generates a spatial frequency spectrum from a sound pickup signal acquired by the sound pickup and transmits it to the receiver 22. The receiver 22 receives the spatial frequency spectrum transmitted from the transmitter 21 thereby to generate a speaker drive signal, and reproduces the sound field on the basis of the acquired speaker drive signal.

The transmitter 21 has a microphone array 31, a temporal frequency analysis unit 32, a spatial frequency analysis unit 33, and a communication unit 34. Further, the receiver 22 has an orientation information acquisition unit 35, a communication unit 36, a drive signal generation unit 37, a spatial filter application unit 38, a spatial frequency synthesis unit 39, a temporal frequency synthesis unit 40, and a speaker array 41.

The microphone array 31 is a linear microphone array or the like configured of a plurality of linearly-arranged microphones, and picks up a planar wave of the incoming audio and supplies a resultant sound pickup signal acquired by each microphone to the temporal frequency analysis unit 32.

The temporal frequency analysis unit 32 performs temporal frequency transform on the sound pickup signal supplied from the microphone array 31, and supplies a resultant temporal frequency spectrum to the spatial frequency analysis unit 33. The spatial frequency analysis unit 33 performs spatial frequency transform on the temporal frequency spectrum supplied from the temporal frequency analysis unit 32, and supplies a resultant spatial frequency spectrum to the communication unit 34.

The communication unit 34 transmits the spatial frequency spectrum supplied from the spatial frequency analysis unit 33 to the communication unit 36 in the receiver 22 in a wired or wireless manner.

Further, the orientation information acquisition unit 35 in the receiver 22 acquires talker's orientation information on an orientation (direction) of a talker, which is a sound source of the audio picked up by the microphone array 31, and supplies it to the spatial filter application unit 38.

There will be described herein an example in which the sound source of the sound field to be picked up is a talker, but the sound source is not limited to a talker, and may be anything such as sound source of object of vehicle or environment sound. Further, the talker's orientation information may be anything indicating a relative positional relationship between a main sound source and a called party, such as a direction of the calling party relative to the called party who listens to the audio from the calling party as sound source, and the description will be continued assuming that the talker's orientation information is the arrival angle θ. In this case, for example, in the example of the next-generation bidirectional communication illustrated in FIG. 1, the arrival angle θ indicating a direction in which wavefront of the audio from the talker W11 to the talker W12 propagates is assumed as talker's orientation information assuming the talker W11 as sound source and the talker W12 as called party. Further, in the following, the talker's orientation information indicating the arrival angle θ will be denoted as talker's orientation information θ.

The communication unit 36 receives the spatial frequency spectrum transmitted from the communication unit 34 and supplies it to the drive signal generation unit 37. The drive signal generation unit 37 generates a speaker drive signal of the spatial domain for reproducing the picked-up sound field on the basis of the spatial frequency spectrum supplied from the communication unit 36, and supplies it to the spatial filter application unit 38.

The spatial filter application unit 38 performs a filter processing using the spatial filter with a characteristic defined by the talker's orientation information supplied from the orientation information acquisition unit 35 on the speaker drive signal supplied from the drive signal generation unit 37, and supplies a resultant spatial filter spectrum to the spatial frequency synthesis unit 39.

The spatial frequency synthesis unit 39 performs spatial frequency synthesis on the spatial filter spectrum supplied from the spatial filter application unit 38, and supplies a resultant temporal frequency spectrum to the temporal frequency synthesis unit 40.

The temporal frequency synthesis unit 40 performs temporal frequency synthesis on the temporal frequency spectrum supplied from the spatial frequency synthesis unit 39, and supplies a resultant speaker drive signal to the speaker array 41. The speaker array 41 is a linear speaker array configured of a plurality of linearly-arranged speakers, for example, and reproduces the audio on the basis of the speaker drive signal supplied from the temporal frequency synthesis unit 40. Thereby, the sound field is reproduced in the sound pickup space.

Each unit configuring the spatial aliasing controller 11 will be described herein in more detail.

(Temporal Frequency Analysis Unit)

The temporal frequency analysis unit 32 analyzes the temporal frequency information of a sound pickup signal s ($n_{mic}$, t) acquired by each microphone configuring the microphone array 31.

Herein, $n_{mic}$ in the sound pickup signal s ($n_{mic}$, t) is a microphone index indicating a microphone configuring the microphone array 31, and the microphone index $n_{mic}=0, \ldots, N_{mic}-1$ is assumed. Here, $N_{mic}$ is the number of microphones configuring the microphone array 31. Further, t in the sound pickup signal s ($n_{mic}$, t) indicates a time.

The temporal frequency analysis unit 32 performs temporal frame division with a fixed size on the sound pickup signal s ($n_{mic}$, t) thereby to acquire an input frame signal $s_{fr}$ ($n_{mic}$, $n_{fr}$, l). The temporal frequency analysis unit 32 then multiplies the input frame signal $s_{fr}$ ($n_{mic}$, $n_{fr}$, l) by a window function $w_T$ ($n_{fr}$) indicated in the following Equation (3) thereby to acquire a window function application signal $s_w$ ($n_{mic}$, $n_{fr}$, l). That is, the following Equation (4) is calculated thereby to calculate the window function application signal $s_w$ ($n_{mic}$, $n_{fr}$, l).

[Mathematical formula 3]

$$w_T(n_{fr}) = \left(0.5 - 0.5\cos\left(2\pi \frac{n_{fr}}{N_{fr}}\right)\right)^{0.5} \quad (3)$$

[Mathematical formula 4]

$$s_w(n_{mic}, n_{fr}, l) = w_T(n_{fr}) s_{fr}(n_{mic}, n_{fr}, l) \quad (4)$$

Here, in Equation (3) and Equation (4), $n_{fr}$ is a temporal index indicating a sample in a temporal frame, and the temporal index $n_{fr}=0, \ldots, N_{fr}-1$ is assumed. Further, l is a temporal frame index, and the temporal frame index $l=0, \ldots, L-1$ is assumed. Additionally, $N_{fr}$ is a frame size (the number of samples in a temporal frame), and L is the total number of frames.

Further, the frame size $N_{fr}$ is the number of samples $N_{fr}$ corresponding to the time $T_{fr}$ [s] of one frame at a temporal sampling frequency $f_s^T$[Hz] (=R($f_s^T \times T_{fr}$), where R( ) is any round-off function). According to the present embodiment, for example, the time $T_{fr}=1.0$[S] of one frame is assumed and the round-off function R( ) is round-off, but any other value may be employed. Further, the frame shift amount is assumed as 50% of the frame size $N_{fr}$, but any other size may be employed.

Further, the square root of Hanning window is used as the window function, but other window such as Hamming window or Blackman-Harris window may be employed.

When the window function application signal $s_w$ ($n_{mic}$, $n_{fr}$, l) is acquired in this way, the temporal frequency analysis unit 32 calculates the following Equation (5) and Equation (6) to perform temporal frequency transform on the window function application signal $s_w$ ($n_{mic}$, $n_{fr}$, l), thereby calculating a temporal frequency spectrum S ($n_{mic}$, $n_T$, l).

[Mathematical formula 5]

$$s'_w(n_{mic}, m_T, l) = \begin{cases} s_w(n_{mic}, m_T, l) & m_T = 0, \cdots, N_{fr}-1 \\ 0 & m_T = N_{fr}, \cdots, M_T-1 \end{cases} \quad (5)$$

[Mathematical formula 6]

$$S(n_{mic}, n_T, l) = \sum_{m_T=0}^{M_T-1} s'_w(n_{mic}, m_T, l)\exp\left(-i2\pi \frac{m_T n_T}{M_T}\right) \quad (6)$$

That is, a zero padding signal $s_w'(n_{mic}, m_T, l)$ is found by calculating Equation (5), and Equation (6) is calculated on the basis of the resultant zero padding signal $s_w'(n_{mic}, m_T, l)$ thereby to calculate a temporal frequency spectrum S ($n_{mic}$, $n_T$, l).

Additionally, in Equation (5) and Equation (6) $M_T$ indicates the number of points used for temporal frequency transform. Further, $n_T$ indicates a temporal frequency spectrum index. Here, $n_T=0, \ldots, N_T-1$ and $N_T=M_T/2+1$ are assumed. Further, i indicates a pure imaginary number in Equation (6).

Further, according to the present embodiment, the temporal frequency transform is performed by use of short time Fourier transform (STFT), but any other temporal frequency transform such as discrete cosine transform (DCT) or modified discrete cosine transform (MDCT) may be used.

Further, the number of points $M_T$ in STFT is a power of 2, which is $N_{fr}$ or more and the closest to $N_{fr}$, but any other number of points $M_T$ may be employed.

The temporal frequency analysis unit 32 supplies the temporal frequency spectrum S ($n_{mic}$, $n_T$, l) acquired in the above-described processing to the spatial frequency analysis unit 33.

(Spatial Frequency Analysis Unit)

Subsequently, the spatial frequency analysis unit 33 performs spatial frequency transform on the temporal frequency spectrum S ($n_{mic}$, $n_T$, l) supplied from the temporal frequency analysis unit 32 by calculating the following Equation (7), thereby calculating a spatial frequency spectrum $S_{SP}$ ($n_S$, $n_T$, l).

[Mathematical formula 7]

$$S_{PS}(n_S, n_T, l) = \frac{1}{M_S} \sum_{m_S=0}^{M_S-1} S'(m_S, n_T, l)\exp\left(i2\pi \frac{m_S n_S}{M_S}\right) \quad (7)$$

Additionally, $M_S$ in Equation (7) indicates the number of points used for spatial frequency transform, where $m_S=0, \ldots, M_S-1$ is assumed. Further, S' ($m_S$, $n_T$, l) indicates a zero-padding temporal frequency spectrum acquired by performing zero padding on the temporal frequency spectrum S ($n_{mic}$, $n_T$, l), and i indicates a pure imaginary number. Furthermore, $n_S$ indicates a spatial frequency spectrum index.

According to the present embodiment, the spatial frequency transform is performed by inverse discrete Fourier transform (IDFT) by calculating Equation (7).

Further, zero padding may be appropriately performed as needed according to the number of points $M_S$ in IDFT. In the example, for the point $m_S$ at $0 \leq m_S \leq N_{mic}-1$, zero-padding temporal frequency spectrum S' ($m_S$, $n_T$, l)=temporal frequency spectrum S ($n_{mic}$, $n_T$, l) is assumed, and for the point $m_S$ at $N_{mic} \leq m_S \leq M_S-1$, zero-padding temporal frequency spectrum S' ($m_S$, $n_T$, l)=0 is assumed.

The spatial frequency spectrum $S_{SP}$ ($n_S$, $n_T$, l) acquired in the above-described processing indicates a waveform of a signal with the temporal frequency $n_T$ included in the temporal frame 1 in the space. The spatial frequency analysis unit 33 supplies the spatial frequency spectrum $S_{SP}$ ($n_S$, $n_T$, l) to the communication unit 34.

(Drive Signal Generation Unit)

The drive signal generation unit 37 is supplied with the spatial frequency spectrum $S_{SP}$ ($n_S$, $n_T$, l) from the spatial frequency analysis unit 33 via the communication unit 36 and the communication unit 34.

The drive signal generation unit 37 calculates the following Equation (8) on the basis of the spatial frequency spectrum $S_{SP}$ ($n_S$, $n_T$, l), and finds a speaker drive signal $D_{SP}$ ($m_S$, $n_T$, l) of the spatial domain for reproducing the sound field (wavefront) by the speaker array 41. That is, the speaker drive signal $D_{SP}$ ($m_S$, $n_T$, l) as spatial frequency spectrum is calculated by the spectral division method (SDM).

[Mathematical formula 8]

$$D_{SP}(m_S, n_T, l) = \begin{cases} 4i\dfrac{\exp\left(-i\sqrt{\left(\frac{\omega}{c}\right)^2 - k^2}\, y_{ref}\right)}{H_0^{(2)}\left(\sqrt{\left(\frac{\omega}{c}\right)^2 - k^2}\, y_{ref}\right)} S_{SP}(n_S, n_T, l) & \text{for } 0 \le |k| < \left|\frac{\omega}{c}\right| \\ 2\pi\dfrac{\exp\left(-i\sqrt{k^2 - \left(\frac{\omega}{c}\right)^2}\, y_{ref}\right)}{K_0\left(\sqrt{k^2 - \left(\frac{\omega}{c}\right)^2}\, y_{ref}\right)} S_{SP}(n_S, n_T, l) & \text{for } 0 \le \left|\frac{\omega}{c}\right| < |k| \end{cases} \quad (8)$$

Additionally, $y_{ref}$ in Equation (8) indicates a reference distance of SDM, and the reference distance $y_{ref}$ indicates a position where the wavefront is accurately reproduced. The reference distance $y_{ref}$ is a distance in a direction orthogonal to the direction in which the microphones configuring the microphone array 31 are arranged. For example, here, reference distance $y_{ref}$=1 [m] is assumed, but any other value may be employed.

Further, $H_0^{(2)}$ in Equation (8) indicates a Hankel function of the second kind, where $K_0$ indicates a Bessel function. Further, i in Equation (8) indicates a pure imaginary number, c indicates a sound speed, and $\omega$ indicates a temporal angle frequency.

Furthermore, k in Equation (8) indicates a spatial frequency, and $m_S$, $n_T$, and l indicate a spatial frequency spectrum index, a temporal frequency spectrum index, and a temporal frame index, respectively.

Additionally, the method for calculating the speaker drive signal $D_{SP}$ ($m_S$, $n_T$, l) in SDM has been described herein by way of example, but the speaker drive signal may be calculated in other method. Further, SDM is described in detail particularly in "Jens Adrens, Sascha Spors, "Applying the Ambisonics Approach on Planar and Linear Arrays of Loudspeakers", in $2^{nd}$ International Symposium on Ambisonics and Spherical Acoustics."

The drive signal generation unit 37 supplies the speaker drive signal $D_{SP}$ ($m_S$, $n_T$, l) acquired as described above to the spatial filter application unit 38.

(Spatial Filter Application Unit)

The spatial filter application unit 38 finds a spatial filter spectrum F ($m_S$, $n_T$, l) by use of the speaker drive signal $D_{SP}$ ($m_S$, $n_T$, l) supplied from the drive signal generation unit 37 and the spatial bandpass filter $B_\theta$ ($m_S$, $n_T$) whose characteristic is determined by the talker's orientation information $\theta$ supplied from the orientation information acquisition unit 35. Additionally, here, the shape of the spatial bandpass filter $B_\theta$ ($m_S$, $n_T$) is rectangular, but any other shape of the spatial bandpass filter $B_\theta$ ($m_S$, $n_T$) may be employed.

Specifically, the spatial filter application unit 38 determines a center frequency $k_{cen}$ and a band width $k_{len}$ of the spatial bandpass filter $B_\theta$ ($m_S$, $n_T$) on the basis of the talker's orientation information $\theta$ thereby to determine a characteristic of the spatial bandpass filter $B_\theta$ ($m_S$, $n_T$). That is, the characteristic of the spatial bandpass filter $B_\theta$ ($m_S$, $n_T$) is determined depending on the arrival angle $\theta$ of the planar wave of the audio from the main sound source of interest.

For example, the spatial filter application unit 38 calculates the following Equation (9) thereby to calculate the center frequency $k_{cen}$, and calculates the following Equation (10) thereby to calculate the band width $k_{len}$.

[Mathematical formula 9]

$$K_{cen} = \frac{k_{lim}}{2}\cos\theta \quad (9)$$

[Mathematical formula 10]

$$k_{len} = 2k_{lim}\left(1 - \left|\frac{\cos\theta}{2}\right|\right) \quad (10)$$

Additionally, in Equation (9) and Equation (10), indicates the talker's orientation information or the arrival angle into the microphone array 31 of the planar wave (audio) output from the sound source toward the called party. Further, in Equation (9) and Equation (10), $k_{lim}$ indicates an upper limit spatial frequency defined by the microphone interval of the microphone array 31 and the speaker interval of the speaker array 41.

The spatial bandpass filter $B_\theta$ ($m_S$, $n_T$) is a bandpass filter assuming the spatial frequency band with the band width $k_{len}$ at the center frequency $k_{len}$ as transmissive frequency band (passband) and other spatial frequency band as cutoff frequency band (stop band).

Thus, the value of the spatial bandpass filter $B_\theta$ ($m_S$, $n_T$) is 1 when the spatial frequency indicated by the spatial frequency spectrum index $m_S$ is a frequency within the transmissive frequency band, and 0 when the spatial frequency indicated by the spatial frequency spectrum index $m_S$ is a frequency within the cutoff frequency band. Thereby, the spatial bandpass filter $B_\theta$ ($m_S$, $n_T$) is a spatial filter for transmitting only the components of the transmissive frequency band.

When the spatial bandpass filter is determined in this way, the spatial filter application unit 38 multiplies the speaker drive signal $D_{SP}$ ($m_S$, $n_T$, l) by the spatial bandpass filter $B_\theta$ ($m_S$, $n_T$) as indicated in the following Equation (11) thereby to acquire a spatial filter spectrum F ($m_S$, $n_T$, l).

[Mathematical formula 11]

$$F(m_S, n_T, l) = D_{SP}(m_S, n_T, l) B_\theta(m_S, n_T) \quad (11)$$

The spatial filter application unit 38 supplies the spatial filter spectrum F ($m_S$, $n_T$, l) acquired by calculating equation (11) to the spatial frequency synthesis unit 39.

The spatial bandpass filter $B_\theta$ ($m_S$, $n_T$) will be further described below.

The center frequency $k_{cen}$ indicated in Equation (9) is $k_{lim}/2$ when the talker's orientation information $\theta$ or the arrival angle $\theta$ is at $\theta$=0, is lower as the arrival angle $\theta$ is closer to $\pi/2$, and is 0 at the arrival angle $\theta$=$\pi/2$. Further, the center frequency $k_{cen}$ is lower as the arrival angle $\theta$ is closer from $\theta$=$\pi/2$ to $\theta$=$\pi$, and is $-k_{lim}/2$ at the arrival angle $\theta$=$\pi$.

Further, the band width $k_{len}$ indicated in Equation (10) is $k_{lim}$ when the arrival angle $\theta$ is at $\theta$=0, is larger as the arrival angle $\theta$ is closer to $\pi/2$, and is $2k_{lim}$ at the arrival angle θ=π/2. Further, the band width $k_{len}$ is smaller as the arrival angle θ is closer from θ=π/2 to θ=π, and is $k_{lim}$ at the arrival angle θ=π.

Figure 4:
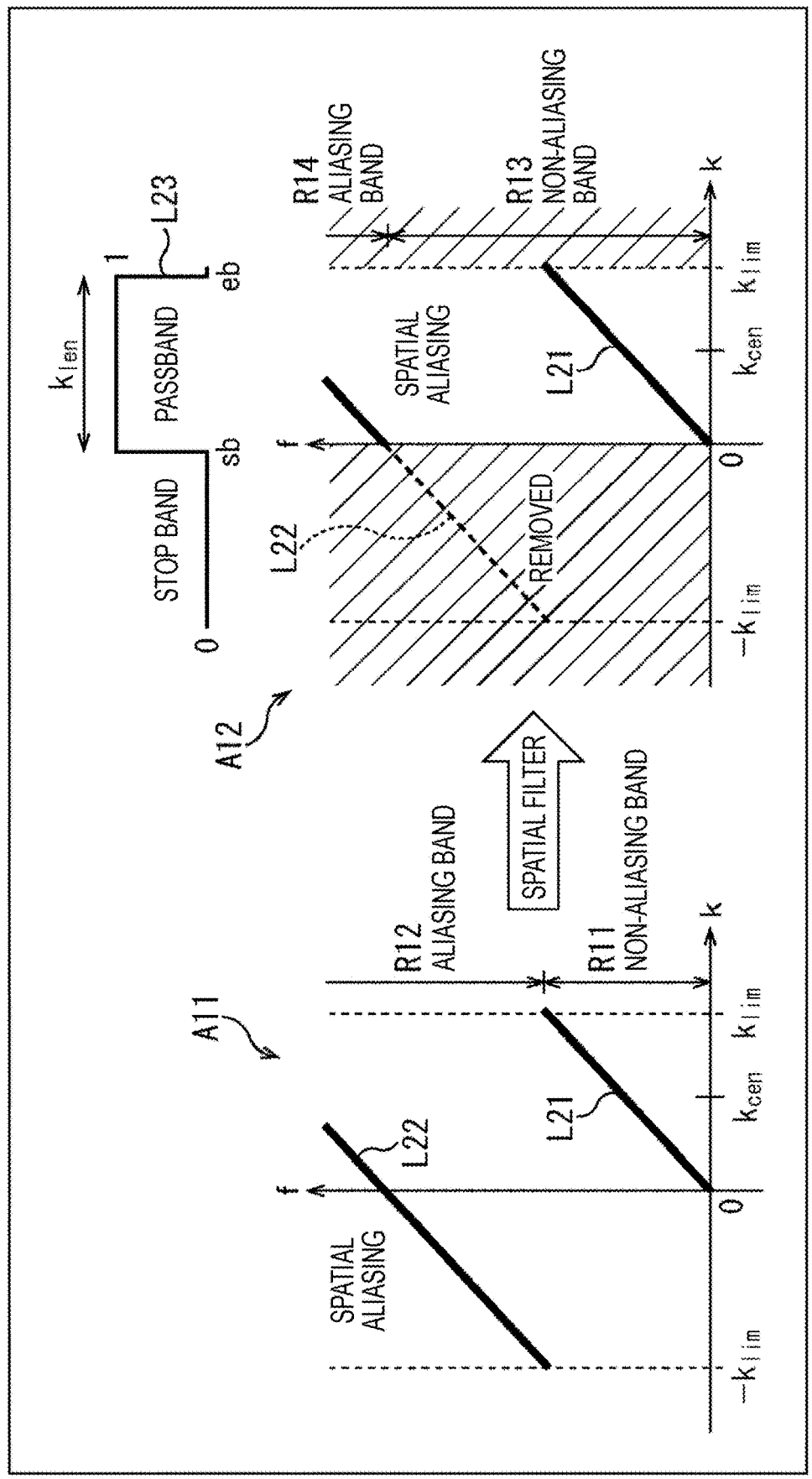
FIG. 4 is a diagram for explaining a characteristic of a spatial bandpass filter.

Therefore, for example, at the arrival angle θ=0, the band in which the spatial frequency k is between 0 and the upper limit spatial frequency $k_{lim}$ as illustrated in FIG. 4 is a transmissive frequency band. Additionally, the vertical axis indicates a temporal frequency f and the horizontal axis indicates a spatial frequency k in FIG. 4.

At the arrival angle θ=0, a spectrum peak indicated by a line L21 and a spectrum peak indicated by a line L22 are observed at the spatial spectrum (angle spectrum) of the planar wave picked up by the microphone array 31 as indicated by an arrow A11.

Here, the spectrum peak indicated by the line L21, which appears in the area in which the spatial frequency k is at k≥0, is to essentially appear. To the contrary, the spectrum peak indicated by the line L22 appears due to spatial aliasing, and it can be seen that the spatial aliasing is conspicuous in the area in which the spatial frequency k is negative.

In the example, the area of the temporal frequency f, in which the spectrum peak indicated by the line L22 is not present, due to the spatial aliasing is a non-aliasing band R11. To the contrary, the area in which the temporal frequency is higher than the upper limit temporal frequency of the non-aliasing band R11 or the upper limit temporal frequency $f_{lim}$ is an aliasing band R12 violated by the spatial aliasing.

Further, at the arrival angle θ=0, the characteristic of the spatial bandpass filter $B_θ$ ($m_S$, $n_T$) is indicated by a polygonal line L23 on the basis of Equation (9) and Equation (10) described above.

That is, the spatial bandpass filter $B_θ$ ($m_S$, $n_T$) has the center frequency $k_{cen}=k_{lim}/2$ and the band width $k_{len}=k_{lim}$ as indicated by an arrow A12. Thus, in the example, the components when the spatial frequency k is between the start frequency sb=0 and the end frequency eb=$k_{lim}$ are transmitted, and the components in other cutoff frequency bands are cut off (removed) by the spatial bandpass filter $B_θ$ ($m_S$, $n_T$).

FIG. 4 illustrates an area in which the shaded area is cut off by the spatial bandpass filter $B_θ$ ($m_S$, $n_T$), and in the example, the area in which the spatial frequency k is negative in the spectrum peak due to the spatial aliasing indicated by the line L22 is removed.

Consequently, a non-aliasing band R13 which is an area at the temporal frequency f, in which the spectrum peak due to the spatial aliasing is not present, is wider than the non-aliasing band R11, and an aliasing band R14 violated by the spatial aliasing is accordingly narrower. In other words, the upper limit temporal frequency $f_{lim}$ can be increased in the filter processing by the spatial bandpass filter $B_θ$ ($m_S$, $n_T$). In the example, the negative spatial frequency component is reduced, and thus the upper limit temporal frequency $f_{lim}$ not violated by the spatial aliasing is doubled.

The upper limit temporal frequency $f_{lim}$ can be increased in the filter processing by the spatial bandpass filter $B_θ$ ($m_S$, $n_T$) in this way, and thus sound quality of the planar wave propagated at the arrival angle θ or the angle θ can be enhanced. Further, the spatial aliasing can be reduced, and thus it is possible to improve localization of the audio image in which a planar wave propagated at other impossible angle is mixed. That is, it is possible to realize more accurate localization of an audio image.

Figure 5:
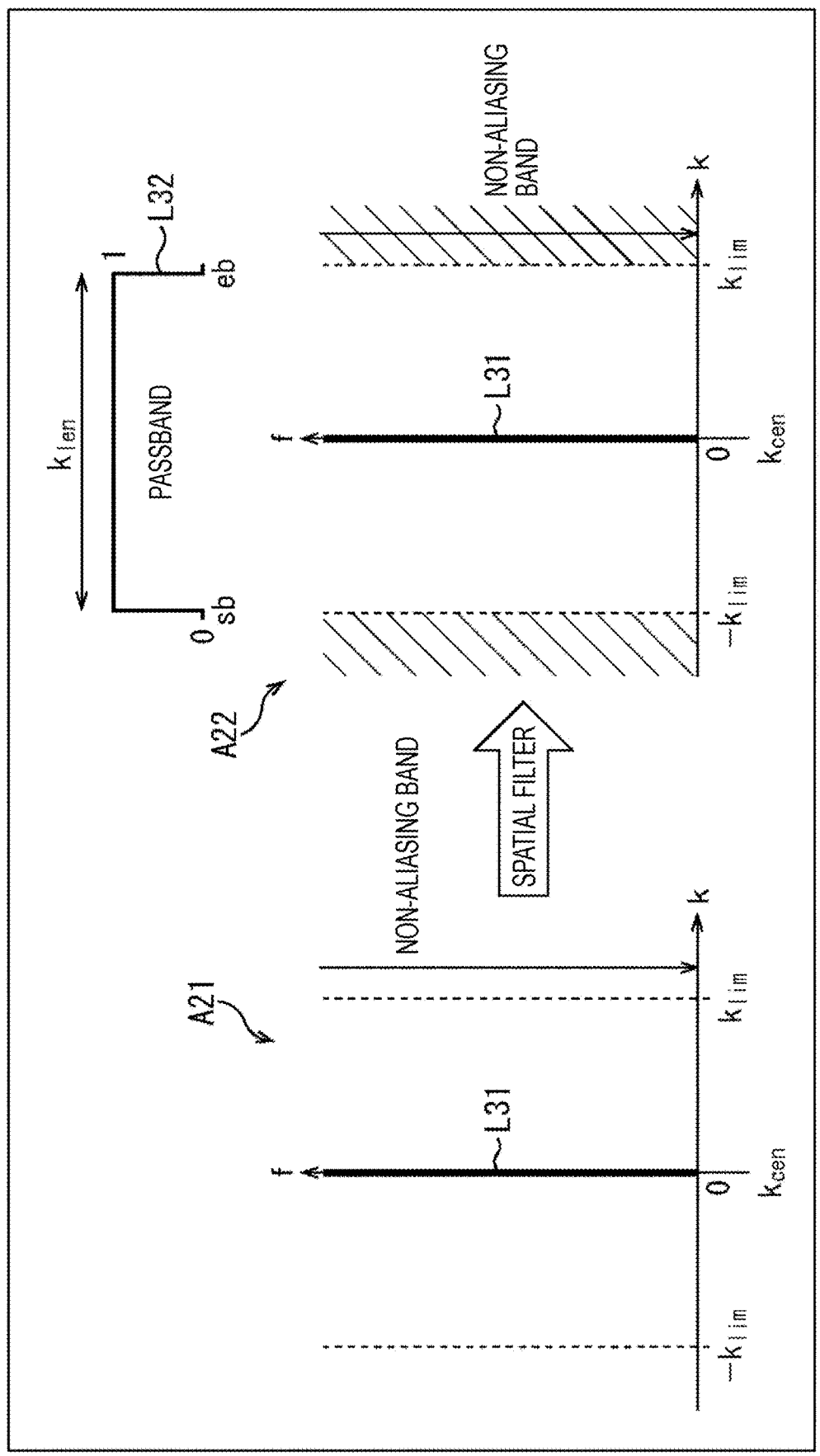
FIG. 5 is a diagram for explaining a characteristic of the spatial bandpass filter.

Similarly, the band in which the spatial frequency k is between –$k_{lim}$ and the upper limit spatial frequency $k_{lim}$ is a transmissive frequency band at the arrival angle θ=π/2 as illustrated in FIG. 5 on the basis of Equation (9) and Equation (10). Additionally, the vertical axis indicates a temporal frequency f and the horizontal axis indicates a spatial frequency k in FIG. 5.

At the arrival angle θ=π/2, a spectrum peak indicated by a line L31 is observed at the spatial spectrum (angle spectrum) of the planar wave picked up by the microphone array 31 as indicated by an arrow A21.

Here, the spectrum peak indicated by the line L31, which appears in the area with the spatial frequency k=0, is to essentially appear. Further, the spatial aliasing does not occur at the arrival angle θ=π/2, and thus a spectrum peak due to the spatial aliasing does not appear. In the example, spatial aliasing does not occur, and thus the total area at the temporal frequency f is a non-aliasing band.

In this way, at the arrival angle θ=π/2, the characteristic of the spatial bandpass filter $B_θ$ ($m_S$, $n_T$) is indicated by a polygonal line L32 on the basis of Equation (9) and Equation (10) described above.

That is, the spatial bandpass filter $B_θ$ ($m_S$, $n_T$) has the center frequency $k_{cen}=0$ and the band width $k_{len}=2k_{lim}$ as indicated by an arrow A22. Thus, in the example, the components when the spatial frequency k is between the start frequency sb=–$k_{lim}$ and the end frequency eb=$k_{lim}$ are transmissive and the components in other cutoff frequency bands are cut off by the spatial bandpass filter $B_θ$ ($m_S$, $n_T$).

Additionally, FIG. 5 illustrates an area in which the shaded area is cut off by the spatial bandpass filter $B_θ$ ($m_S$, $n_T$). In the example, the start frequency sb is –$k_{lim}$ and the end frequency eb is $k_{lim}$, and thus the positive and negative spatial frequency components are not particularly reduced.

When the filter processing is performed by the spatial bandpass filter $B_θ$ ($m_S$, $n_T$) as described above, the upper limit temporal frequency $f_{lim}$ can be increased and the sound quality of the planar wave propagated at the arrival angle θ of special interest can be enhanced, thereby improving localization of the audio image.

Additionally, when the components in the cutoff frequency band are removed by the spatial bandpass filter $B_θ$ ($m_S$, $n_T$), the sound quality of the planar wave propagated at a different angle from the angle θ is deteriorated due to the removed components. Thus, the range of the area in which the audio can be taken with preferable sound quality is accordingly narrower in the reproduction space.

However, as the arrival angle θ is closer to π/2 or the spatial aliasing is smaller, the band width $k_{len}$ is larger and the area in which the audio can be taken at more preferable sound quality is wider, and thus the spatial aliasing controller 11 can restrict the effects caused by the filter processing.

Additionally, there has been described above the example in which the transmissive frequency band is set depending on the talker's orientation information θ for the spatial frequency as a characteristic of the spatial bandpass filter $B_θ$ ($m_S$, $n_T$), but the transmissive frequency band may be set depending on the talker's orientation information θ only for the temporal frequency.

Further, the transmissive frequency band may be set depending on the talker's orientation information θ for both the spatial frequency and the temporal frequency, respectively, as a characteristic of the spatial bandpass filter $B_θ$ ($m_S$, $n_T$). In such a case, the center frequency and the band width depending on the talker's orientation information θ, or the transmissive frequency band is determined for not only the spatial frequency but also the temporal frequency. Then, when the spatial frequency indicated by the spatial frequency spectrum index $m_S$ is within the transmissive frequency band and the temporal frequency indicated by the temporal frequency spectrum index $n_T$ is within the transmissive frequency band, the value of the spatial bandpass filter $B_\theta$ ($m_S$, $n_T$) is 1. That is, the spatial bandpass filter $B_\theta$ ($m_S$, $n_T$) is for transmitting only the components in the transmissive frequency band of the spatial frequency and the transmissive frequency band of the temporal frequency.

(Spatial Frequency Synthesis Unit)

The spatial frequency synthesis unit 39 will be subsequently described.

The spatial frequency synthesis unit 39 calculates the following Equation (12) to perform spatial frequency synthesis on the spatial filter spectrum F ($m_S$, $n_T$, l) supplied from the spatial filter application unit 38, or inverse spatial frequency transform on the spatial filter spectrum F ($m_S$, $n_T$, l), thereby calculating a temporal frequency spectrum D ($n_{spk}$, $n_T$, l). In Equation (12), discrete Fourier transform (DFT) is performed as inverse spatial frequency transform.

[Mathematical formula 12]

$$D(n_{spk}, n_T, l) = \sum_{m_S=0}^{M_S-1} F(m_S, n_T, l)\exp\left(-i2\pi\frac{m_S n_{spk}}{M_S}\right) \quad (12)$$

Additionally, $n_{spk}$ in Equation (12) indicates a speaker index for specifying a speaker configuring the speaker array 41. Further, $M_S$ indicates the number of points in DFT, and i indicates a pure imaginary number.

The spatial frequency synthesis unit 39 supplies the thus-acquired temporal frequency spectrum D ($n_{spk}$, $n_T$, l) to the temporal frequency synthesis unit 40.

(Temporal Frequency Synthesis Unit)

The temporal frequency synthesis unit 40 calculates the following Equation (13) to perform temporal frequency synthesis on the temporal frequency spectrum D ($n_{spk}$, $n_T$, l) supplied from the spatial frequency synthesis unit 39, thereby acquiring an output frame signal $d_{fr}$ ($n_{spk}$, $n_{fr}$, l). Here, inverse short time Fourier transform (ISTFT) is used for temporal frequency synthesis, but any method corresponding to the inverse transform of the temporal frequency transform performed by the temporal frequency analysis unit 32 may be used.

[Mathematical formula 13]

$$d_{fr}(n_{spk}, n_{fr}, l) = \frac{1}{M_T}\sum_{m_T=0}^{M_T-1} D'(n_{spk}, m_T, l)\exp\left(i2\pi\frac{n_{fr}m_T}{M_T}\right) \quad (13)$$

Additionally, D' ($n_{spk}$, $m_T$, l) in Equation (13) is acquired in the following Equation (14).

[Mathematical formula 14]

$$D'(n_{spk}, m_T, l) = \begin{cases} D(n_{spk}, m_T, l) & m_T = 0, \cdots, N_T - 1 \\ \mathrm{conj}(D(n_{spk}, M_T - m_T, l)) & m_T = N_T, \cdots, M_T - 1 \end{cases} \quad (14)$$

In Equation (13), i indicates a pure imaginary number and $n_{fr}$ indicates a temporal index. Further, in Equation (13) and Equation (14), $M_T$ indicates the number of points in ISTFT, and $n_{spk}$ indicates a speaker index.

Furthermore, the temporal frequency synthesis unit 40 multiplies the resultant output frame signal $d_{fr}$ ($n_{spk}$, $n_{fr}$, l) by the window function $w_T$ ($n_{fr}$), and performs overlap addition thereby to perform frame synthesis. For example, frame synthesis is performed by calculating the following Equation (15), and thus an output signal d ($n_{spk}$, t) is found.

[Mathematical formula 15]

$$d^{curr}(n_{spk}, n_{fr}+lN_{fr}) = d_{fr}(n_{spk}, n_{fr}, l)w_T(n_{fr}) + d^{prev}(n_{spk}, n_{fr}+lN_{fr}) \quad (15)$$

Additionally, here, the same window function as used by the temporal frequency analysis unit 32 is used as the window function $w_T$ ($n_{fr}$) multiplied by the output frame signal $d_{fr}$ ($n_{spk}$, $n_{fr}$, l), but a rectangular window may be employed for other window such as Hamming window.

Further, in Equation (15), both $d^{Prev}$ ($n_{spk}$, $n_{fr}+lN_{fr}$) and $d^{curr}$ ($n_{spk}$, $n_{fr}+lN_{fr}$) indicate an output signal d ($n_{spk}$, t), but $d^{preev}$ ($n_{spk}$, $n_{fr}+lN_{fr}$) indicates a non-updated value and $d^{curr}$ ($n_{spk}$, $n_{fr}+lN_{fr}$) indicates an updated value.

The temporal frequency synthesis unit 40 supplies the thus-acquired output signal d ($n_{spk}$, t) as speaker drive signal to the speaker array 41.

<Description of Sound Field Reproduction Processing>

A flow of the processings performed by the spatial aliasing controller 11 described above will be described below.

When instructed to pick up a planar wave of the audio in the sound pickup space, the spatial aliasing controller 11 performs a sound field reproduction processing of picking up the planar wave to reproduce the sound field.

Figure 6:
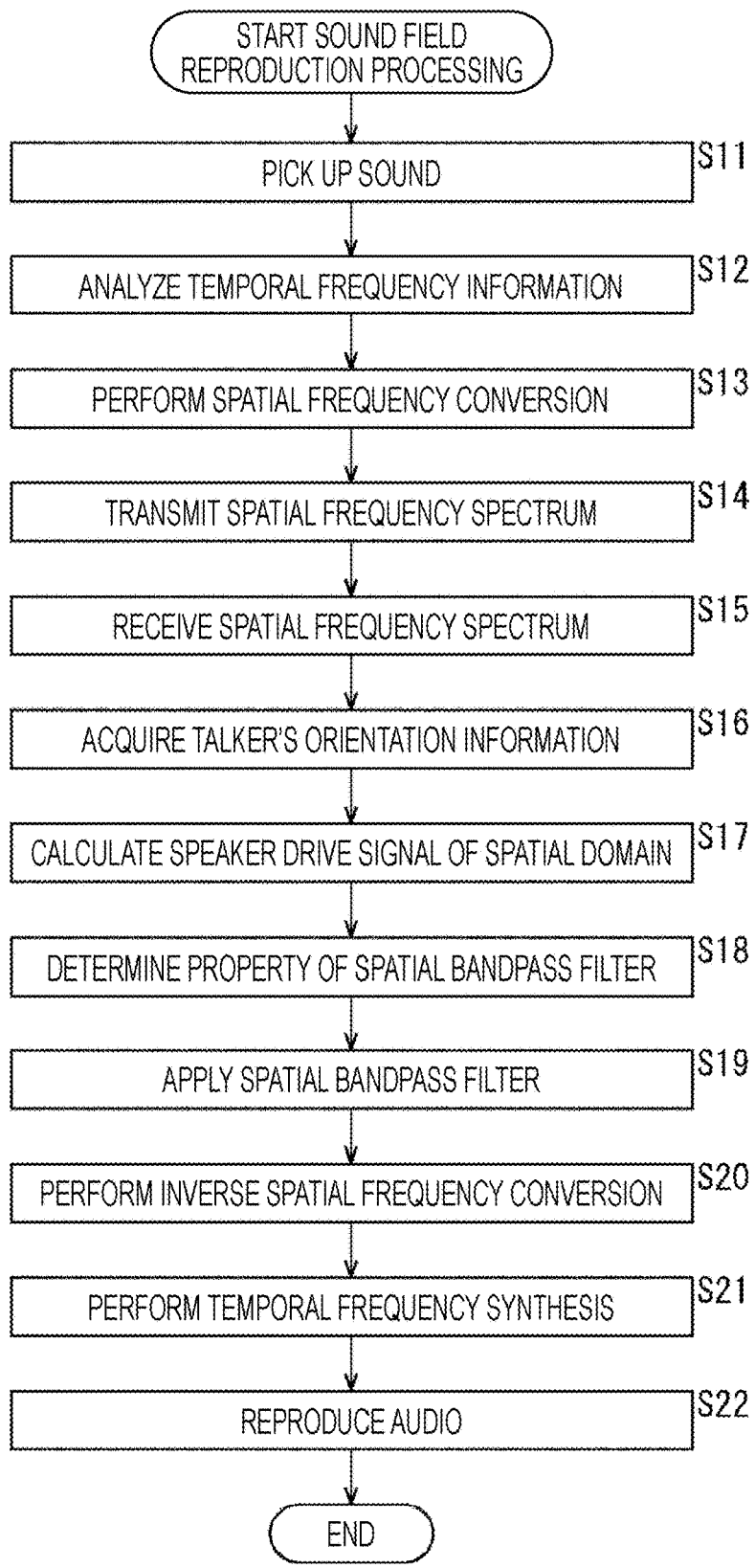
FIG. 6 is a flowchart for explaining a sound field reproduction processing.

The sound field reproduction processing by the spatial aliasing controller 11 will be described below with reference to the flowchart of FIG. 6.

In step S11, the microphone array 31 picks up a planar wave of the audio in the sound pickup space, and supplies a resultant sound pickup signal s ($n_{mic}$, t) to the temporal frequency analysis unit 32.

In step S12, the temporal frequency analysis unit 32 analyzes temporal frequency information of the sound pickup signal s ($n_{mic}$, t) supplied from the microphone array 31.

Specifically, the temporal frequency analysis unit 32 performs temporal frame division on the sound pickup signal s ($n_{mic}$, t), and multiplies a resultant input frame signal $s_{fr}$ ($n_{mic}$, $n_{fr}$, l) by the window function $w_T$ ($n_{fr}$) thereby to calculate a window function application signal $s_w$ ($n_{mic}$, $n_{fr}$, l).

Further, the temporal frequency analysis unit 32 performs temporal frequency transform on the window function application signal $s_W$ ($n_{mic}$, $n_{fr}$, l), and supplies a resultant temporal frequency spectrum S ($n_{mic}$, $n_T$, l) to the spatial frequency analysis unit 33. That is, Equation (6) is calculated to calculate the temporal frequency spectrum S ($n_{mic}$, $n_T$, l).

In step S13, the spatial frequency analysis unit 33 performs spatial frequency transform on the temporal frequency spectrum S ($n_{mic}$, $n_T$, l) supplied from the temporal frequency analysis unit 32, and supplies a resultant spatial frequency spectrum $S_{SP}$ ($n_S$, $n_T$, l) to the communication unit 34.

Specifically, the spatial frequency analysis unit 33 calculates Equation (7) thereby to transform the temporal frequency spectrum S ($n_{mic}$, $n_T$, l) into the spatial frequency spectrum $S_{SP}$ ($n_S$, $n_T$, l).

In step S14, the communication unit 34 transmits the spatial frequency spectrum $S_{SP}$ ($n_S$, $n_T$, l) supplied from the spatial frequency analysis unit 33 to the receiver 22 arranged in the reproduction space via wireless communication. Then in step S15, the communication unit 36 in the receiver 22 receives the spatial frequency spectrum $S_{SP}$ ($n_S$, $n_T$, l) transmitted via wireless communication, and supplies it to the drive signal generation unit 37.

In step S16, the orientation information acquisition unit 35 acquires the talker's orientation information θ, and supplies it to the spatial filter application unit 38. For example, the talker's orientation information θ may be previously defined or may be acquired from the transmitter 21 or the like.

In step S17, the drive signal generation unit 37 calculates a speaker drive signal $D_{SP}$ ($m_S$, $n_T$, l) of the spatial domain on the basis of the spatial frequency spectrum $S_{SP}$ ($n_S$, $n_T$, l) supplied from the communication unit 36, and supplies it to the spatial filter application unit 38. For example, the drive signal generation unit 37 calculates Equation (8) thereby to calculate the speaker drive signal $D_{SP}$ ($m_S$, $n_T$, l) of the spatial domain.

In step S18, the spatial filter application unit 38 determines a characteristic of the spatial bandpass filter $B_θ$ ($m_S$, $n_T$) on the basis of the talker's orientation information θ supplied from the orientation information acquisition unit 35.

For example, the spatial filter application unit 38 calculates Equation (9) and Equation (10) described above to calculate the center frequency $k_{cen}$ and the band width $k_{len}$ of the spatial bandpass filter $B_θ$ ($m_S$, $n_T$), thereby determining a characteristic of the spatial bandpass filter $B_θ$ ($m_S$, $n_T$) or the transmissive frequency band.

In step S19, the spatial filter application unit 38 applies the spatial bandpass filter $B_θ$ ($m_S$, $n_T$) with the determined characteristic to the speaker drive signal $D_{SP}$ ($m_S$, $n_T$, l) supplied from the drive signal generation unit 37.

That is, the spatial filter application unit 38 calculates Equation (11) to perform the filter processing using the spatial bandpass filter $B_θ$ ($m_S$, $n_T$) on the speaker drive signal $D_{SP}$ ($M_S$, $n_T$, l), thereby acquiring a spatial filter spectrum F ($m_S$, $n_T$, l).

The spatial filter application unit 38 supplies the spatial filter spectrum F ($m_S$, $n_T$, l) acquired in the filter processing to the spatial frequency synthesis unit 39.

In step S20, the spatial frequency synthesis unit 39 performs inverse spatial frequency transform on the spatial filter spectrum F ($m_S$, $n_T$, l) supplied from the spatial filter application unit 38, and supplies a resultant temporal frequency spectrum D ($n_{spk}$, $n_T$, l) to the temporal frequency synthesis unit 40. For example, the spatial frequency synthesis unit 39 calculates Equation (12) to perform inverse spatial frequency transform.

In step S21, the temporal frequency synthesis unit 40 performs temporal frequency synthesis on the temporal frequency spectrum D ($n_{spk}$, $n_T$, l) supplied from the spatial frequency synthesis unit 39.

Specifically, the temporal frequency synthesis unit 40 calculates Equation (13) thereby to calculate an output frame signal $d_{fr}$ ($n_{spk}$, $n_{fr}$, l) on the basis of the temporal frequency spectrum D ($n_{spk}$, $n_T$, l). Further, the temporal frequency synthesis unit 40 multiplies the output frame signal $d_{fr}$ ($n_{spk}$, $n_{fr}$, l) by the window function $w_T$ ($n_{fr}$) to calculate Equation (15), thereby calculating an output signal d ($n_{spk}$, t) by frame synthesis.

The temporal frequency synthesis unit 40 supplies the thus-acquired output signal d ($n_{spk}$, t) as speaker drive signal to the speaker array 41.

In step S22, the speaker array 41 reproduces the audio on the basis of the speaker drive signal supplied from the temporal frequency synthesis unit 40, and terminates the sound field reproduction processing. When the audio is reproduced on the basis of the speaker drive signal in this way, the sound field of the sound pickup space is reproduced in the reproduction space.

As described above, the spatial aliasing controller 11 determines the characteristic of the spatial bandpass filter $B_θ$ ($m_S$, $n_T$) on the basis of the talker's orientation information θ, and applies the spatial bandpass filter $B_θ$ ($m_S$, $n_T$) to the speaker drive signal $D_{SP}$ ($M_S$, $n_T$, l) thereby to reduce the spatial aliasing.

In this way, the spatial aliasing is reduced by use of the spatial bandpass filter $B_θ$ ($m_S$, $n_T$) with the characteristic depending on the talker's orientation information θ, thereby increasing the upper limit temporal frequency $f_{lim}$, enhancing the sound quality, and improving localization of the audio image. Additionally, the spatial aliasing controller 11 can reduce the spatial aliasing in a simple processing such as filter processing without the need to prepare a special speaker array, thereby increasing the upper limit temporal frequency at lower cost.

Incidentally, a series of processings described above can be performed in hardware or in software. When the series of processings is performed in software, the programs configuring the software are installed in a computer. Here, the computer may be a computer incorporated in dedicated hardware, a general-purpose personal computer capable of performing various functions by installing various programs therein, or the like.

Figure 7:
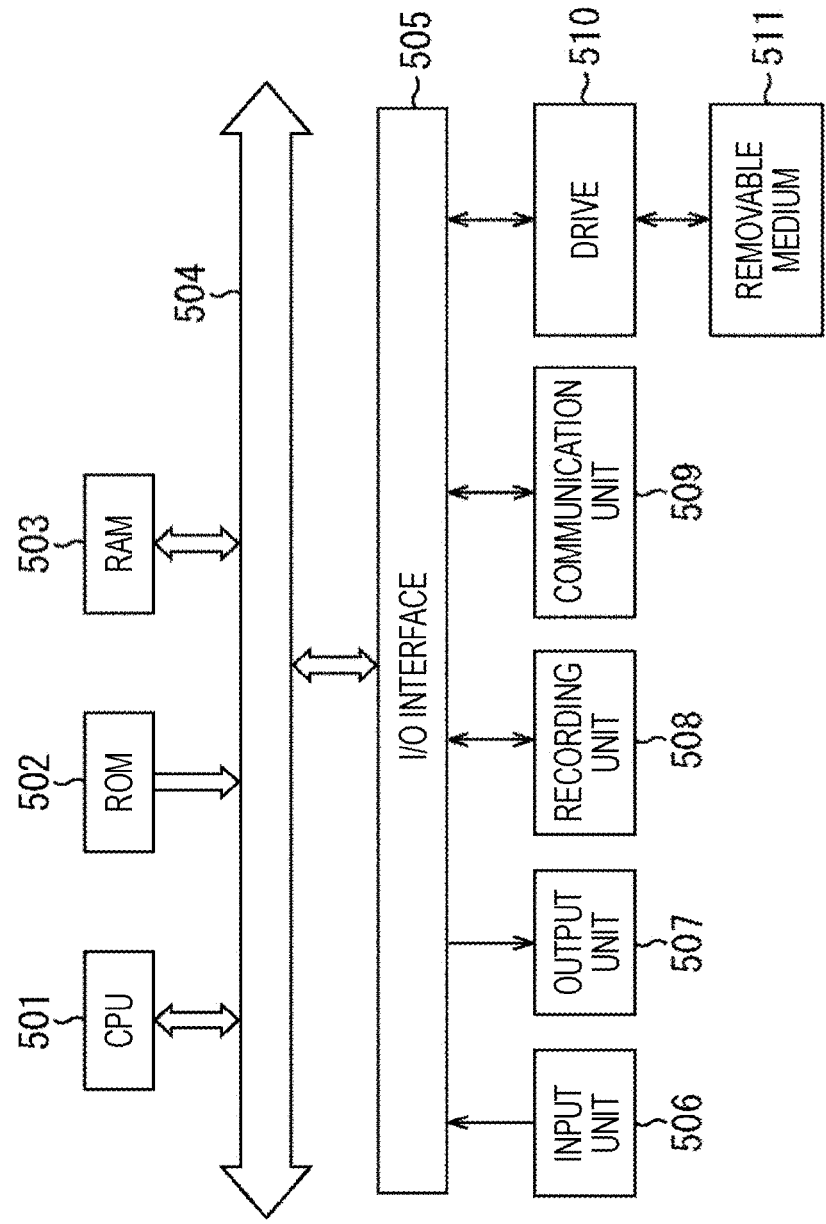
FIG. 7 is a diagram illustrating an exemplary configuration of a computer.

FIG. 7 is a block diagram illustrating an exemplary hardware configuration of a computer for performing the series of processings described above by the programs.

In the computer, a central processing unit (CPU) 501, a read only memory (ROM) 502, and a random access memory (RAM) 503 are mutually connected via a bus 504.

The bus 504 is further connected with an I/O interface 505. The I/O interface 505 is connected with an input unit 506, an output unit 507, a recording unit 508, a communication unit 509, and a drive 510.

The input unit 506 is configured of a keyboard, mouse, microphone, image pickup device, or the like. The output unit 507 is configured of a display, speaker, or the like. The recording unit 508 is configured of a hard disc, nonvolatile memory, or the like. The communication unit 509 is configured of a network interface or the like. The drive 510 drives a removable medium 511 such as magnetic disc, optical disc, magnetooptical disc, or semiconductor memory.

In the thus-configured computer, the CPU 501 loads and executes the programs recorded in the recording unit 508 into the RAM 503 via the I/O interface 505 and the bus 504 thereby to perform the series of processings described above, for example.

The programs executed by the computer (the CPU 501) can be recorded and provided in the removable medium 511 as package medium or the like, for example. Further, the programs can be provided via a wired or wireless transmission medium such as local area network, Internet, or digital satellite broadcasting.

In the computer, the removable medium 511 is mounted on the drive 510 so that the programs can be installed in the recording unit 508 via the I/O interface 505. Further, the programs can be received in the communication unit 509 and installed in the recording unit 508 via a wired or wireless transmission medium. Additionally, the programs can be previously installed in the ROM 502 or the recording unit 508.

Additionally, the programs executed by the computer may be a program by which the processings are performed in time series in the order described in the specification or a program by which the processings are performed in parallel or at necessary timings such as on calling.

Further, embodiments of the present technology are not limited to the above embodiment, and can be variously modified without departing from the spirit of the present technology.

For example, the present technology can take a cloud computing configuration in which one function is distributed and processed in a plurality of apparatuses via a network.

Further, each step described in the above flowchart can be performed in one apparatus and can be distributed and performed in a plurality of apparatuses.

Furthermore, when one step includes a plurality of processings, the processings included in one step can be performed in one apparatus and can be performed in a plurality of apparatuses.

Moreover, the present technology can employ the following configurations.

[1]
An audio processing apparatus including:
an orientation information acquisition unit for acquiring orientation information on a direction of a sound source; and
a spatial filter application unit for applying a spatial filter with a characteristic defined by the orientation information to a sound pickup signal acquired by picking up the audio from the sound source by a microphone array configured of a plurality of microphones.

[2]
The audio processing apparatus according to [1],
wherein the spatial filter application unit determines a center frequency and a band width as characteristic of the spatial filter on the basis of the orientation information.

[3]
The audio processing apparatus according to [2],
wherein the spatial filter is directed for transmitting a component in a transmissive frequency band of the sound pickup signal assuming a band of a spatial frequency defined by the center frequency and the bandwidth as the transmissive frequency band.

[4]
The audio processing apparatus according to [2] or [3],
wherein the spatial filter is directed for transmitting a component in a transmissive frequency band of the sound pickup signal assuming a band of a temporal frequency defined by the center frequency and the bandwidth as the transmissive frequency band.

[5]
The audio processing apparatus according to any one of [2] to [4],
wherein the spatial filter application unit determines a characteristic of the spatial filter such that as an angle formed between a direction of the sound source indicated by the orientation information and the microphone array is closer to $\pi/2$, the band width is larger.

[6]
The audio processing apparatus according to any one of [1] to [5],
wherein the microphone array is a linear microphone array.

[7]
An audio processing method including the steps of:
acquiring orientation information on a direction of a sound source; and
applying a spatial filter with a characteristic defined by the orientation information to a sound pickup signal acquired by picking up the audio from the sound source by a microphone array configured of a plurality of microphones.

[8]
A program for causing a computer to perform a processing including the steps of:
acquiring orientation information on a direction of a sound source; and
applying a spatial filter with a characteristic defined by the orientation information to a sound pickup signal acquired by picking up the audio from the sound source by a microphone array configured of a plurality of microphones.

REFERENCE SIGNS LIST

11 Spatial aliasing controller
31 Microphone array
32 Temporal frequency analysis unit
33 Spatial frequency analysis unit
35 Orientation information acquisition unit
37 Drive signal generation unit
38 Spatial filter application unit
39 Spatial frequency synthesis unit
40 Temporal frequency synthesis unit
41 Speaker array

The invention claimed is:

1. An audio processing apparatus comprising:
an orientation information acquisition unit for acquiring sound source orientation information indicative of a direction of a sound source with respect to a microphone array configured of a plurality of microphones; and
a spatial filter application unit for applying a spatial bandpass filter with a characteristic defined by the sound source orientation information to a sound pickup signal acquired by picking up audio from the sound source by the microphone array,
wherein the spatial filter application unit determines a center spatial frequency and a spatial band width as characteristic of the spatial bandpass filter on the basis of the sound source orientation information,
wherein the characteristic of the spatial bandpass filter is controlled in response to the sound source orientation information,
wherein the sound source orientation information is acquired from the sound source with no transmission of sound by the microphone array, and
wherein the spatial filter application unit determines the characteristic of the spatial bandpass filter such that the band width of the spatial bandpass filter is larger when an angle formed between a direction of the sound source indicated by the orientation information and the microphone array is closer to $\pi/2$.

2. The audio processing apparatus according to claim 1,
wherein the spatial bandpass filter is directed for transmitting a component in a transmissive frequency band of the sound pickup signal assuming a band of a spatial frequency defined by the center spatial frequency and the spatial band width as the transmissive frequency band.

3. The audio processing apparatus according to claim 1,
wherein the spatial bandpass filter is directed for transmitting a component in a transmissive frequency band of the sound pickup signal assuming a band of a temporal frequency defined by the center spatial frequency and the spatial band width as the transmissive frequency band.

4. The audio processing apparatus according to claim 1, wherein the microphone array is a linear microphone array.

5. An audio processing method comprising:
acquiring sound source orientation information indicative of a direction of a sound source with respect to a microphone array configured of a plurality of microphones; and
applying a spatial bandpass filter with a characteristic defined by the sound source orientation information to a sound pickup signal acquired by picking up audio from the sound source by the microphone array, including determining a center spatial frequency and a spatial band width as characteristic of the spatial bandpass filter on the basis of the sound source orientation information,
wherein the characteristic of the spatial bandpass filter is controlled in response to the sound source orientation information,
wherein the sound source orientation information is acquired from the sound source with no transmission of sound to the sound source, and
wherein the characteristic of the spatial bandpass filter is determined such that the band width of the spatial bandpass filter is larger when an angle formed between a direction of the sound source indicated by the orientation information and the microphone array is closer to $\pi/2$.

6. A non-transitory computer-readable medium containing instructions that, when executed by a processing device, perform an audio processing method comprising:
acquiring sound source orientation information indicative of a direction of a sound source with respect to a microphone array configured of a plurality of microphones; and
applying a spatial bandpass filter with a characteristic defined by the sound source orientation information to a sound pickup signal acquired by picking up audio from the sound source by the microphone array, including determining a center spatial frequency and a spatial band width as characteristic of the spatial bandpass filter on the basis of the sound source orientation information,
wherein the characteristic of the spatial bandpass filter is controlled in response to the sound source orientation information,
wherein the sound source orientation information is acquired from the sound source with no transmission of sound to the sound source, and
wherein the characteristic of the spatial bandpass filter is determined such that the band width of the spatial bandpass filter is larger when an angle formed between a direction of the sound source indicated by the orientation information and the microphone array is closer to $\pi/2$.

* * * * *